US012619097B2

(12) United States Patent     (10) Patent No.: US 12,619,097 B2
Park     (45) Date of Patent: May 5, 2026

(54) EYEWEAR

(71) Applicant: KOREA O.G.K CO., LTD., Wonju-si (KR)

(72) Inventor: Soo An Park, Seongnam-si (KR)

(73) Assignee: KOREA O.G.K. CO., LTD, Wonju-si (KR)

( * ) Notice: Subject to any disclaimer, the term of this patent is extended or adjusted under 35 U.S.C. 154(b) by 272 days.

(21) Appl. No.: 18/530,824

(22) Filed: Dec. 6, 2023

(65) Prior Publication Data

US 2024/0111175 A1     Apr. 4, 2024

Related U.S. Application Data

(63) Continuation of application No. PCT/KR2023/003231, filed on Mar. 9, 2023.

(30) Foreign Application Priority Data

May 17, 2022     (KR) ........................ 10-2022-0059988

(51) Int. Cl.
*G02C 1/02*     (2006.01)
(52) U.S. Cl.
CPC ...................................... *G02C 1/02* (2013.01)
(58) Field of Classification Search
None
See application file for complete search history.

(56) References Cited

U.S. PATENT DOCUMENTS

| | | | | |
|---|---|---|---|---|
| 5,592,242 A | * | 1/1997 | Ooie | ........................ G02C 5/146 |
| | | | | 351/110 |
| 6,293,671 B1 | * | 9/2001 | Masunaga | ................. G02C 9/00 |
| | | | | 351/41 |
| 9,804,420 B2 | * | 10/2017 | Chute | ........................ G02C 7/10 |
| 2002/0163617 A1 | | 11/2002 | Vitaloni | |
| 2009/0027614 A1 | * | 1/2009 | Siu | ............................ G02C 1/02 |
| | | | | 351/57 |
| 2016/0299353 A1 | | 10/2016 | Chen | |
| 2017/0184872 A1 | * | 6/2017 | Silver | ........................ G02C 1/10 |
| 2017/0329153 A1 | | 11/2017 | Strenz | |

FOREIGN PATENT DOCUMENTS

| | | |
|---|---|---|
| CN | 104793346 A | 7/2015 |
| JP | 3883676 B2 | 2/2007 |
| KR | 200276589 Y1 | 5/2002 |
| KR | 100578947 B1 | 5/2006 |
| KR | 20-0477485 Y1 | 6/2015 |
| KR | 10-1618451 B1 | 5/2016 |
| WO | 2021069930 A1 | 4/2021 |

OTHER PUBLICATIONS

Extended Europen Search Report for EP23807755.6.

* cited by examiner

*Primary Examiner* — Sharrief I Broome
*Assistant Examiner* — Journey F Sumlar
(74) *Attorney, Agent, or Firm* — Dinsmore & Shohl LLP

(57)     ABSTRACT

Disclosed is eyewear with minimized exposure of a frame to the outside, the eyewear including: a lens formed at a position facing a user's left and right eyes when the eyewear is worn, with integrated portions corresponding to the left and right eyes; a frame comprising a first frame and a second frame, each coupled to one surface at each of both side ends of the lens; and a temple coupled to the frame.

10 Claims, 8 Drawing Sheets

【FIGURE 1】
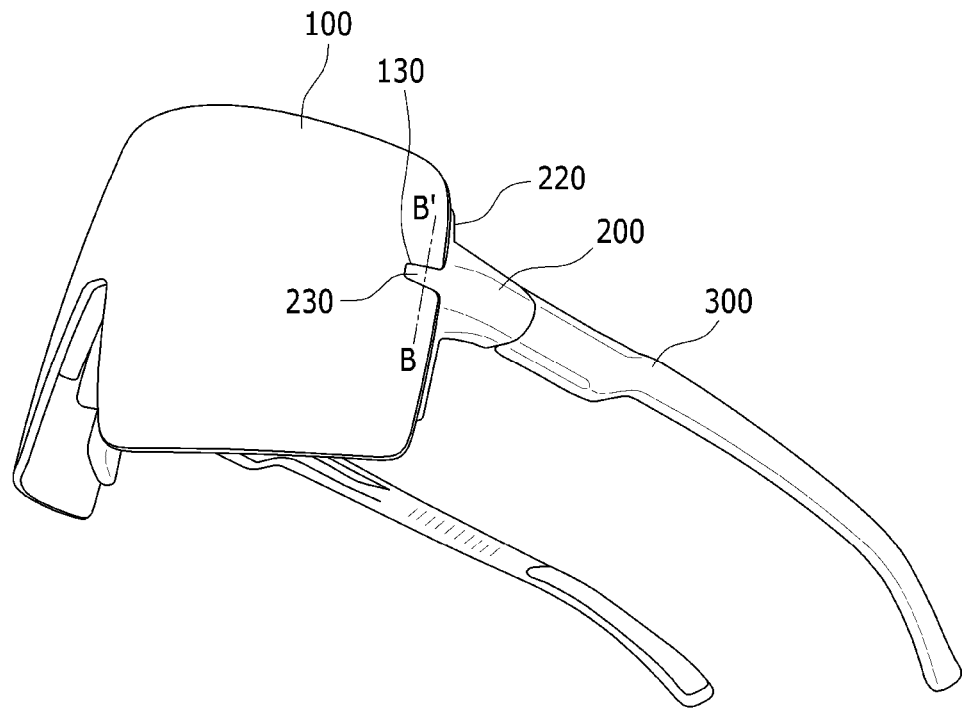
【FIGURE 2】
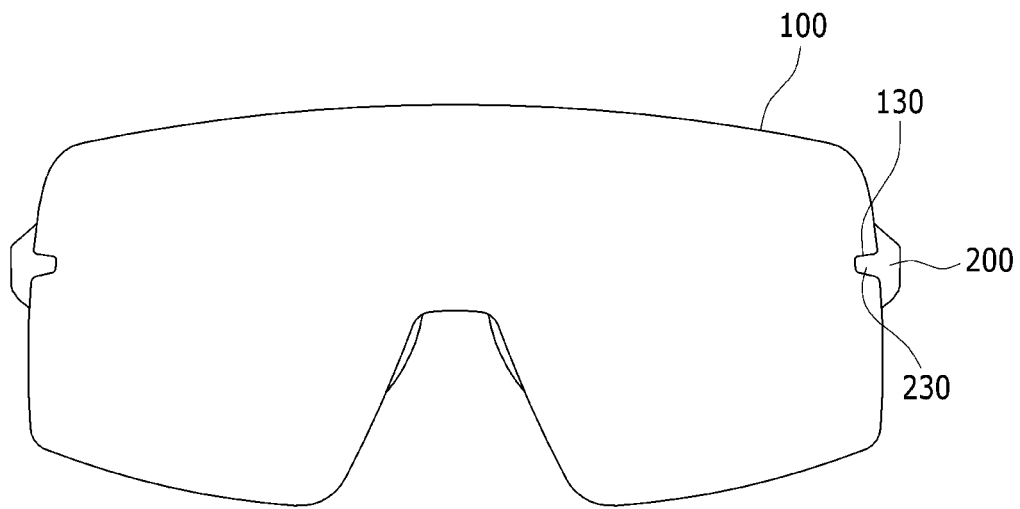

【FIGURE 3】
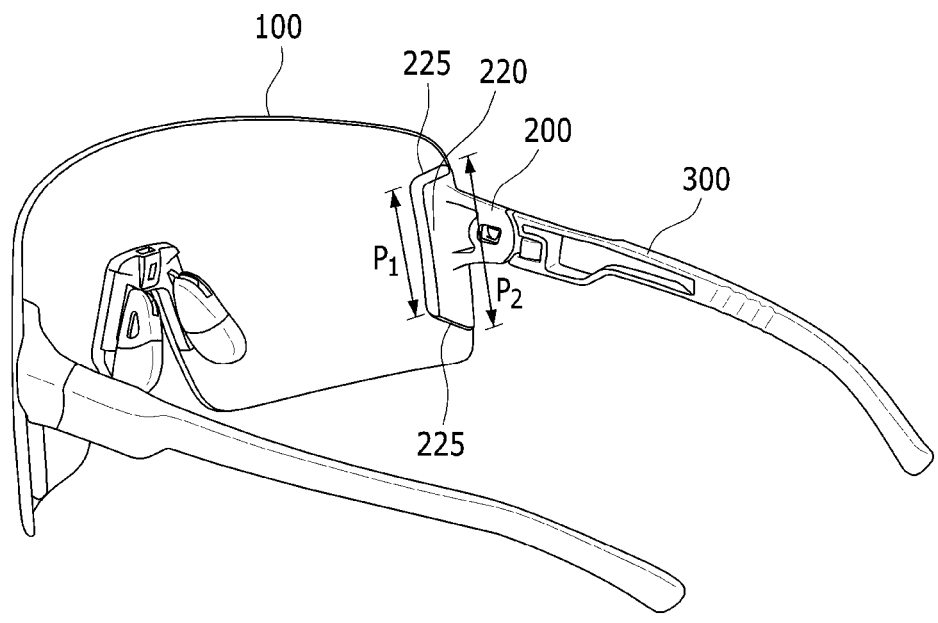
【FIGURE 4】
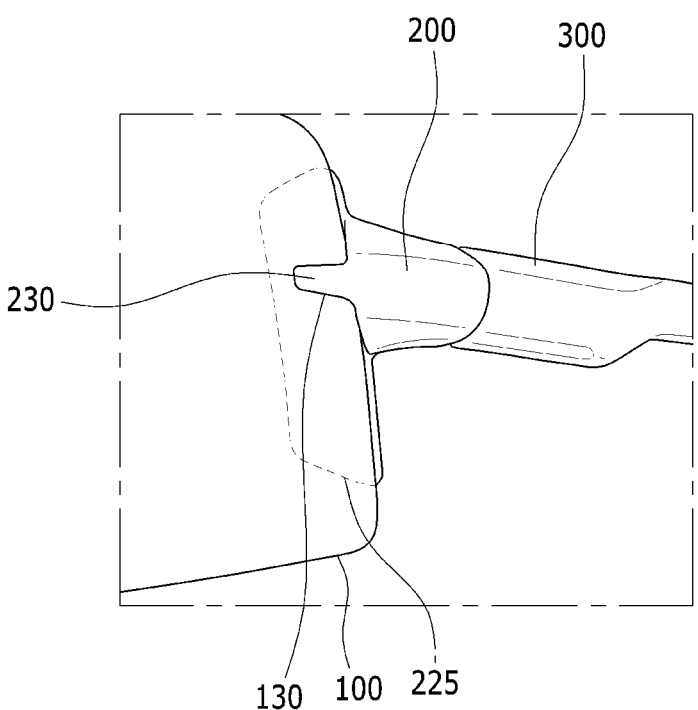

【FIGURE 5】
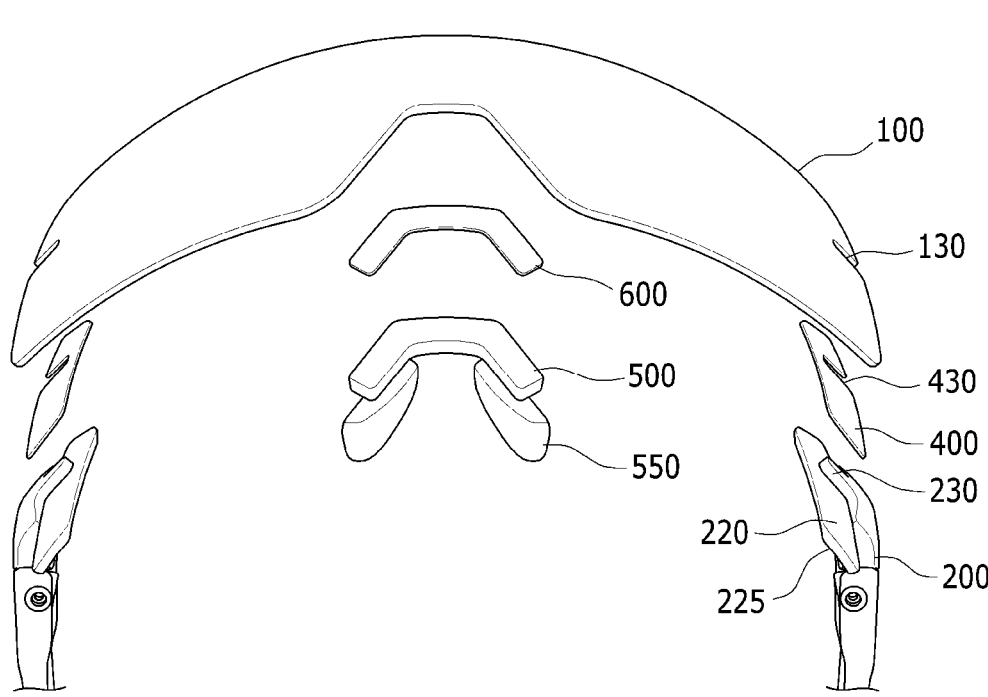

【FIGURE 6】
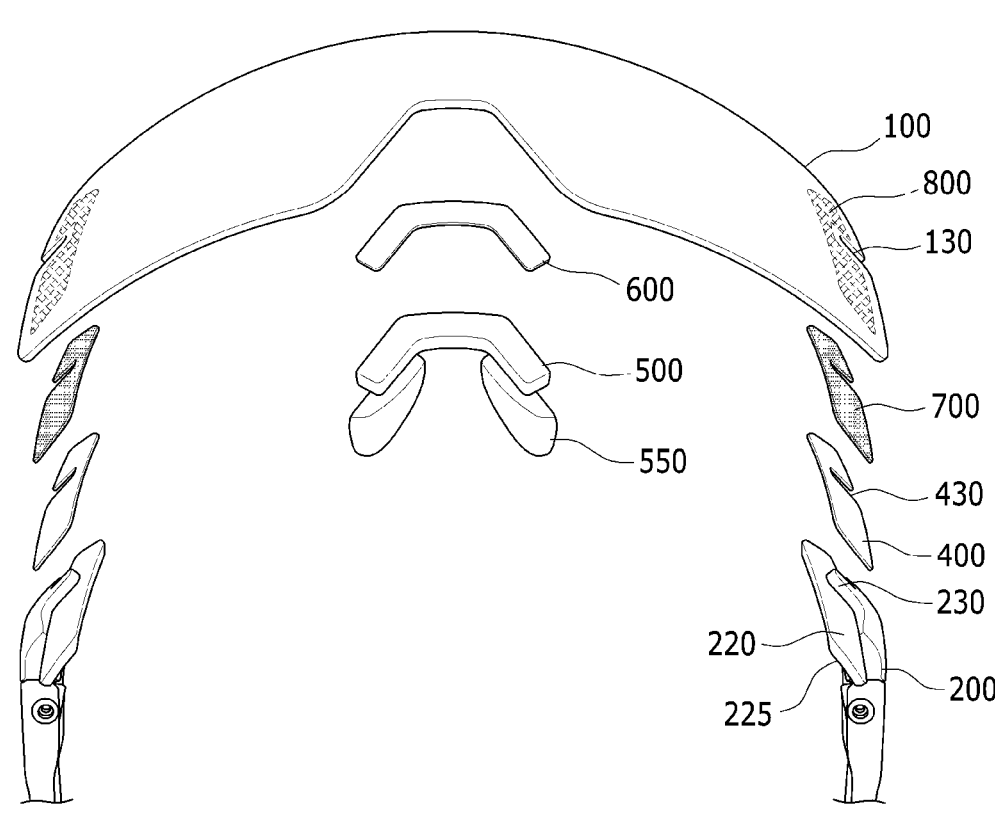

【FIGURE 7】
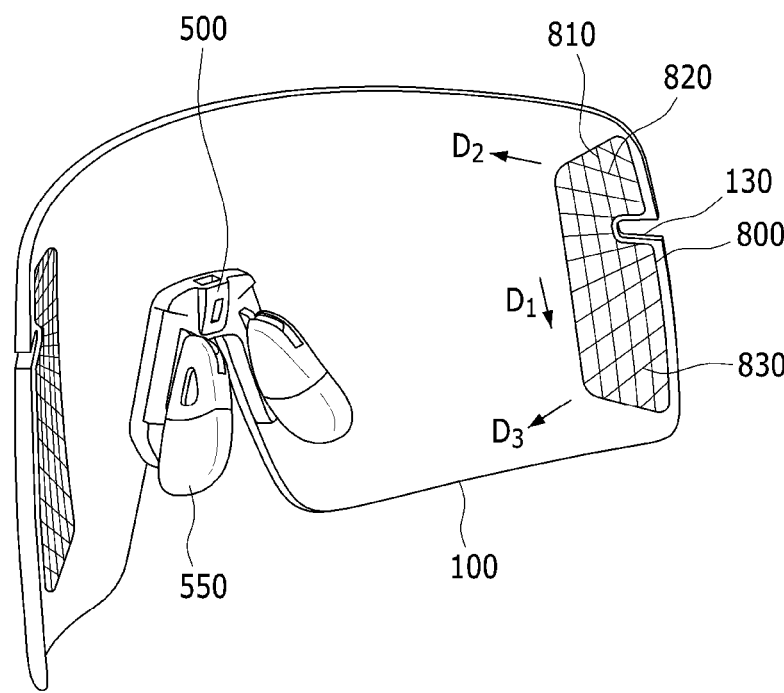
【FIGURE 8】
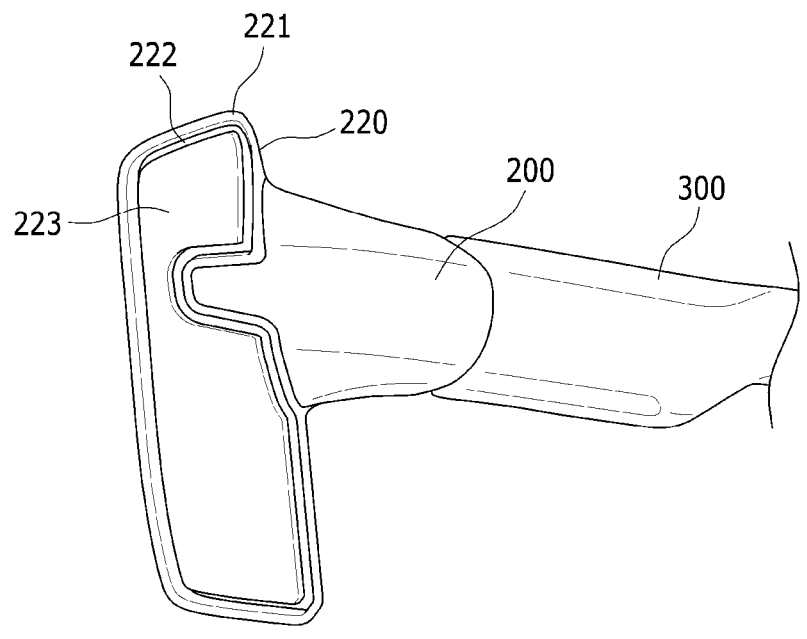

【FIGURE 9】
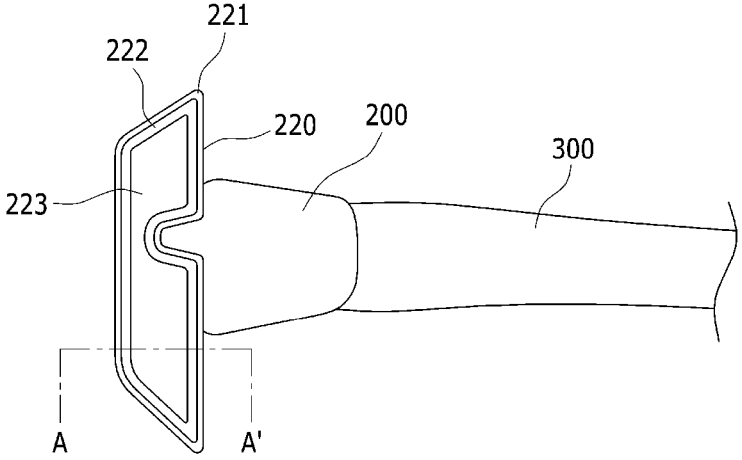
【FIGURE 10】
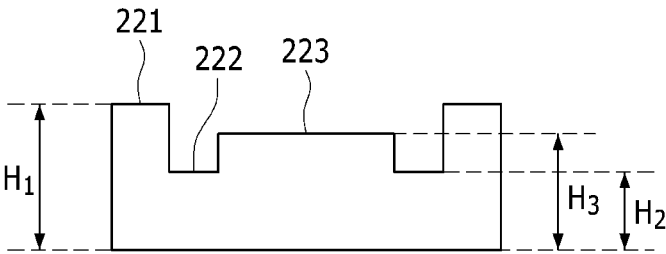
【FIGURE 11】
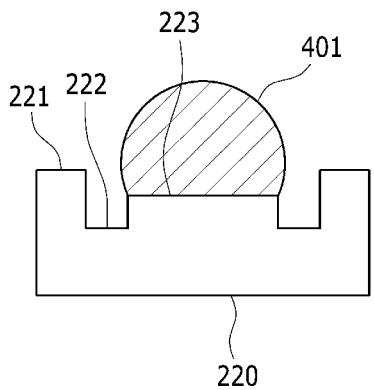

【FIGURE 12】
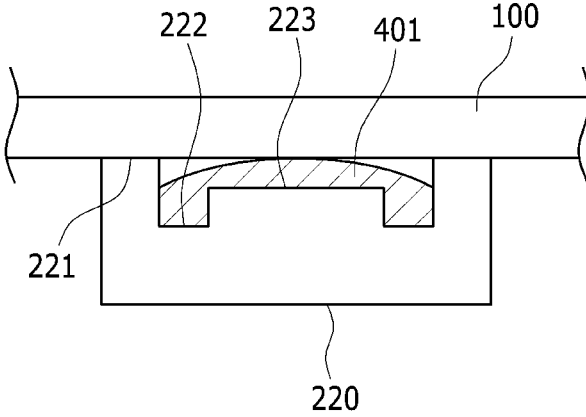
【FIGURE 13】
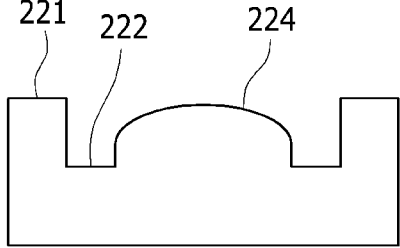
【FIGURE 14】
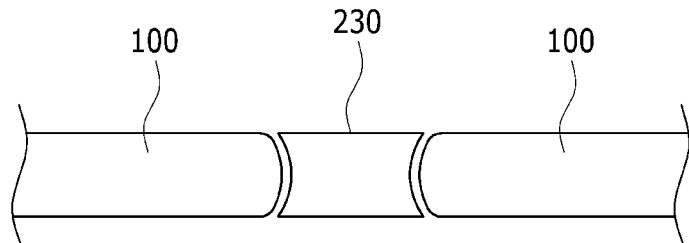

【FIGURE 15】
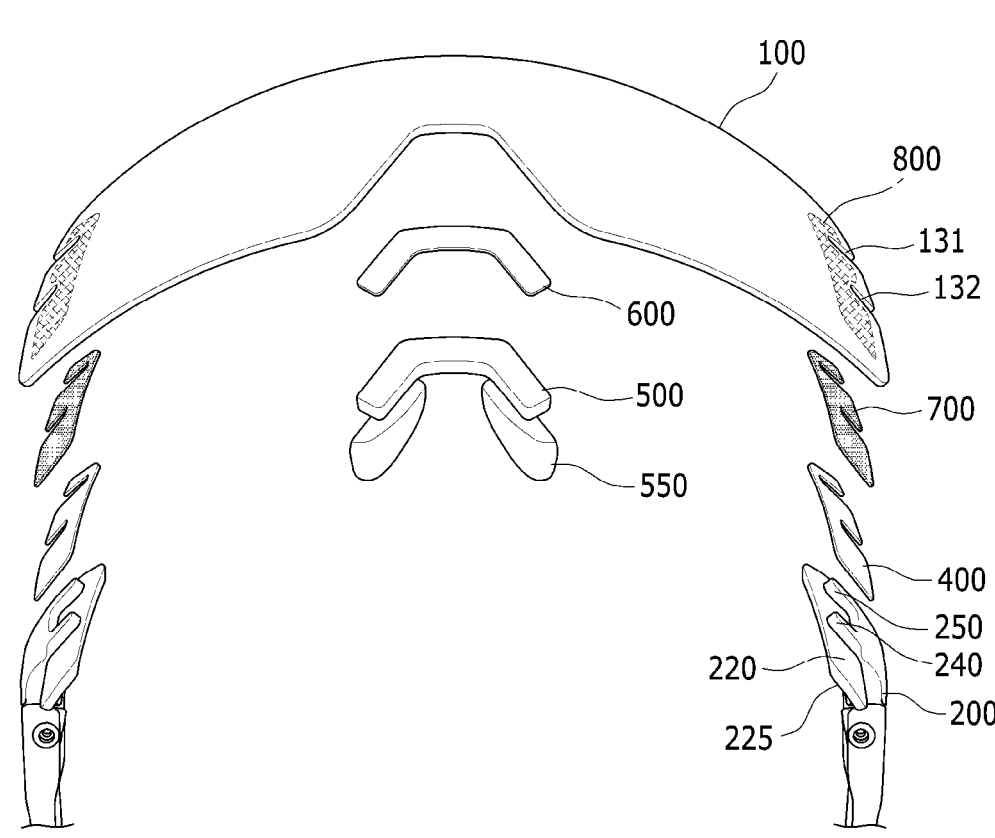

EYEWEAR

CROSS REFERENCE TO RELATED APPLICATIONS

This application is a continuation of International Patent Application No. PCT/KR2023/003231, filed Mar. 9, 2023, which claims priority to KR10-2022-0059988, filed May 17, 2022, the entire contents of each of which are incorporated herein by reference in their entirety.

TECHNICAL FIELD

The present disclosure relates to eyewear with minimized exposure of a frame to the outside.

BACKGROUND ART

Eyewear includes general eyeglasses made of a transparent material with adjustable refractive indices, and products such as sunglasses and goggles that reduce light transmission to prevent glare and protect a user's eyes from ultraviolet rays. Sunglasses and similar products commonly use transparent materials with added dyes or coatings, or materials that reflect light, to manufacture them. This is done to reduce glare for users and protect their eyes from ultraviolet rays. Commonly used sunglasses and the like are manufactured by adding colorants to transparent eyeglass materials or coating or depositing light-reflecting materials to reduce glare to users or protect their eyes from ultraviolet rays. Meanwhile, in general, eyewear consists of a lens, which is clear or colored in a transparent part, a frame to support the lens, and temples connected to the frame and securing the eyewear to a user's face. Recently, due to various individual styles, design has become a crucial factor in eyewear, beyond its inherent functionality. As a result, eyewear with various designs to cater to different preferences are manufactured.

Meanwhile, the frame is fixed to the edge of the lens, serving the dual purpose of protecting the lens and connecting it to the temples. A frame with minimized visibility from the outside is often highly praised for its superior design. In other words, it is possible to minimize the portion of the frame visible from the outside when viewed from a user's facial profile. In this case, from the user's facial profile, only the lens is practically visible, thus providing eyewear that is exceptionally superior in design.

However, the basic function of the frame is to support the lens and connect the lens to the temples, but if the frame is minimized, this function may be compromised. Therefore, there is a need for eyewear that minimizes the frame's visibility from the outside while stably supporting the lens, securely connecting the lens and the temples, and providing durability.

DISCLOSURE

Technical Problem

Accordingly, an object of the present disclosure is to provide eyewear capable of minimizing a portion of a frame visible from the outside of a lens. In particular, the object is to provide eyewear capable of minimizing visibility of a frame from the outside of a lens in which a left-eye portion and a right-eye portion are integrated.

In addition, another object of the present disclosure is to provide eyewear capable of securely connecting and fixing a lens and temples while minimizing a frame, preventing the frame from easily detaching from the lens, and enhancing durability by preventing an adhesive material from escaping to the outside.

In addition, yet another object of the present disclosure is to provide eyewear capable of minimizing a frame while coupling the frame to an accurate position of the lens.

Technical objects of the present disclosure are not limited to the above-described objects and other technical objects that have not been described above may become evident to those skilled in the art from the following description.

Technical Solution

In one aspect, there is provided eyewear with minimized exposure of a frame to the outside, the eyewear including: a lens formed at a position facing a user's left and right eyes when the eyewear is worn, with integrated portions corresponding to the left and right eyes; a frame comprising a first frame and a second frame, each coupled to one surface at each of both side ends of the lens; and a temple coupled to the frame. The frame is coupled to one surface of the lens with an adhesive layer interposed. The lens includes a recessed guide groove formed by being recessed inward from each of the both side ends toward center of the lens, and the frame comprises a protruding guide portion to be inserted into the recessed guide groove of the lens when being coupled at each of the both side ends of the lens. The protruding guide portion of the frame is exposed to an outside through the recessed guide groove on the other surface of the lens, so that the frame contacts only one surface at each of the both side ends of the lens.

Further, the lens may include one surface facing the user, the other surface facing the outside, lateral edges in a left-right direction, and upper and lower edges in a top-bottom direction, and the frame may be coupled to only one surface at each of the lateral edges of the lens.

In addition, in the first frame or the second frame, a first width at a position close to the center of the lens on a cross-section of a horizontal plane identical to a horizontal plane of the lens, may be smaller than a second width at a lateral edge of the lens.

In addition, the first frame or the second frame may include a frame bonding surface having one end to be coupled to the lens, and a temple coupling portion extending from the frame bonding surface and bent toward a rear end for coupling the temple, and the protruding guide portion of the frame may protrude between the frame bonding surface and the leg coupling portion to match a shape of the recessed guide groove of the lens.

In addition, an area formed by the adhesive layer may be included within an area of the frame bonding surface.

In addition, the lens may further include a surface-treated area formed at a position facing the frame bonding surface.

In addition, the eyewear may further include a coloration layer disposed between the lens and the adhesive layer and applied to the surface-treated area of the lens.

In addition, the surface-treated area of the lens may be formed by creating scratches in a portion of a surface of the lens by laser cutting or etching, and the surface-treated area is composed of: a first scratch sloping and spaced apart in a first direction toward the center of the lens, which is a direction in which the recessed guide groove of the lens is formed; a second scratch sloping and spaced apart in a direction different from the first direction; and a third scratch spaced apart in a direction perpendicular to the first direction toward the center of the lens.

In addition, the frame bonding surface may further include an overflow prevention line protruding to form a closed curve on an outer edge.

In addition, the frame bonding surface may further include a recessed line formed by being recessed inside a closed curve formed by the overflow prevention line adjacent to a position where the overflow prevention line is formed, thereby forming a closed curve.

Additionally, an inner area of the recessed line of the frame bonding surface may curve toward the center so that a surface in contact with the lens faces the lens.

In addition, the recessed guide groove of the lens may have a vertical cross-section that is convexly curved toward the center of the lens, a vertical cross-section the protruding guide portion at each of the both side ends of the frame may have a concave shape that gradually curves inward toward the center to correspond to a shape of the recessed guide groove, and when the protruding guide portion of the frame is coupled to the recessed guide groove of the lens, the protruding guide portion may be slidably coupled so that a concave shape of the protruding guide portion corresponds to a curved shape of the recessed guide groove.

In addition, the recessed guide groove of the lens may be formed as a plurality of recessed guide grooves, spaced apart from each other, and the protruding guide portion of the frame may also be formed as a plurality of protruding guide portions, spaced apart from each other, to correspond to a number of the recessed guide grooves.

Specific details of other embodiments are included in the detailed description and the drawings.

Advantageous Effects

According to embodiments of the present disclosure, there are at least the following effects.

In eyewear according to the present disclosure, it is possible to minimize a visible portion of the frame from the outside of the integrally formed lens.

In addition, it is possible to securely connect and fix the lens and temples while minimizing the frame, preventing the FIG. 2 is a front view of eyewear with minimized exposure of a frame to the outside according to an embodiment of the present disclosure.

FIG. 3 is a rear perspective view of eyewear with minimized exposure of a frame to the outside according to an embodiment of the present disclosure.

FIG. 4 is an enlarged view showing how a lens and a frame are coupled in eyewear according to an embodiment of the present disclosure.

FIG. 5 is a schematic exploded perspective view of eyewear with minimized exposure of a frame to the outside according to an embodiment of the present disclosure.

FIG. 6 is a schematic exploded perspective view of eyewear with minimized exposure of a frame to the outside according to another embodiment of the present disclosure.

FIG. 7 is a rear perspective view showing a lens portion according to yet another embodiment of the present disclosure.

FIG. 8 is a side perspective view schematically showing the frame and temples according to yet another embodiment of the present disclosure.

FIG. 9 is a side view schematically showing a frame and a temple according to yet another embodiment of the present disclosure.

FIG. 10 is a cross-sectional view taken along line A-A' in FIG. 9.

FIG. 11 is a cross-sectional view showing a state in which an adhesive member is applied to a frame according to an embodiment of the present disclosure.

FIG. 12 is a cross-sectional view schematically showing how a lens and a frame are coupled by an adhesive member according to an embodiment of the present disclosure.

FIG. 13 is a cross-sectional view showing a portion taken along line A-A' of FIG. 9 according to another embodiment of the present disclosure.

FIG. 14 is a cross-sectional view showing a portion taken along line B-B' of FIG. 1 according to another embodiment of the present disclosure.

FIG. 15 is a schematic exploded perspective view of eyewear with minimized exposure of a frame to the outside according to yet another embodiment of the present disclosure.

[Detailed Description of Main Elements]

| | | |
|---|---|---|
| 100: lens | 130, 131, 132: recessed guide groove | 200: frame |
| 220: frame bonding surface | 221: overflow prevention line | 222: recessed line |
| 225: temple coupling portion | 230, 240, 250: protruding guide portion | 300: temple |
| 400, 401, 402: adhesive layer | 500: nose pad frame | 550: nose pad |
| 600: nose pad adhesive member | 700: coloration layer | 800: surface-treated area |
| 810: third scratch | 820: first scratch | 830: second scratch | frame from easily detaching from the lens, and enhancing durability by preventing an adhesive material from escaping to the outside.

In addition, it is possible to ensure that the frame is coupled to a correct position of the lens while minimizing visibility of the frame.

The effects according to the present disclosure are not limited by the contents exemplified above, and more various effects are included in the present specification.

DESCRIPTION OF DRAWINGS

FIG. 1 is a front perspective view of eyewear with minimized exposure of a frame to the outside according to an embodiment of the present disclosure.

MODE FOR DISCLOSURE

The features and advantages of the present disclosure and the method to achieve them will become more apparent from the following detailed description in conjunction with the accompanying drawings. The present disclosure may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present disclosure will only be defined by the appended claims. Like reference numerals refer to like elements throughout the specification. In the drawings, sizes and relative sizes of layers and regions may be exaggerated for clarity.

Spatially relative terms, such as "beneath," "below," "lower," "above," "upper" and the like, may be used herein for ease of description to describe one element or feature's relationship to another element(s) or feature(s) as illustrated in the figures.

In this specification, although the terms first, second, etc. may be used to describe various elements, it should be understood that these elements are not limited by these terms. These terms are only used to distinguish one element from another. Therefore, a first element could be termed as a second element without departing from the scope of exemplary embodiments of the present disclosure.

In addition, eyewear described in the following may refer to a product with lenses positioned to correspond to the user's eyes, including sports glasses, sunglasses, safety glasses, and regular eyeglasses. Here, the term "lens" refers to an integrally formed lens in which portions corresponds to the user's left and right eyes are integrated.

Hereinafter, embodiments of the present disclosure will be described with reference to the drawings.

FIG. 1 shows a front perspective view of eyewear with minimized exposure of a frame to the outside according to an embodiment of the present disclosure, FIG. 2 shows a front view of eyewear with minimized exposure of a frame to the outside according to an embodiment of the present disclosure, and FIG. 3 shows a rear perspective view of eyewear with minimized exposure of a frame to the outside according to an embodiment of the present disclosure. In addition, FIG. 4 shows an enlarged view of a lens and frame being coupled in eyewear according to an embodiment of the present disclosure, and FIG. 5 shows a schematic exploded perspective view of eyewear with minimized exposure of a frame to the outside according to an embodiment of the present disclosure.

Referring to FIGS. 1 to 5, eyewear with minimized exposure of a frame to the outside according to an embodiment of the present disclosure includes: a lens 100 formed at a position facing a user's left and right eyes facing each other when the eyewear is worn, with integrated portions corresponding to the left and right eyes; a frame 200 including a first frame and a second frame, each coupled to one surface at each of both side ends of the lens 100; and a temple 300 coupled to the frame 200. The frame 200 is coupled to one surface of the lens 100 with an adhesive layer 400 interposed. The lens 100 includes a recessed guide groove 130 that is formed inward toward the center of the lens 100 from the both side ends. The frame 200 includes a protruding guide portion 230 that is inserted into the recessed guide grooves 130 of the lens 100 when the frame is coupled to each of the both side ends of the lens 100. On the other surface of the lens 100, the protruding guide portion 230 of the frame 200 is exposed to the outside through the recessed guide grooves 130, so that the frame 200 contact only one surface at each of the both side ends of the lens 100.

In the case of regular eyewear, a frame for fixing a lens is coupled to cover both outer and inner surfaces in a thickness direction of the lens. In other words, regular eyewear has a form where the thickness direction (top and bottom) of the lens is inward, fixing the lens. Thus, when looking at a user wearing eyewear from the outside, a significant portion of the frame is exposed and visible. Accordingly, the present disclosure may provide eyewear with improved visibility and excellent design by minimizing a visible portion of the frame from the outside while only a lens performing an optical function is made as visible as possible from the outside.

Meanwhile, the lens 100 is formed at a position facing the user's left and right eyes when the eyewear is worn, with integrated portions corresponding to the left and right eyes. That is, the lens 100 is integrally formed to have portions of the lens 100 corresponding to the left and right eyes are coupled to each other at the center, and the frame 200 is coupled to only one surface at each of the both side ends of the integrally formed lens to form a frame 200, thereby minimizing visibility of the frame 200 from the outside. The lens 100 may be curved in a first direction with respect to the horizontal surface of the lens 100 or in a second direction perpendicular to the first direction. However, the lens 100 is not limited to any particular shape.

In addition, the frame 200 includes a first frame and a second frame and is coupled to one surface at each of the both side ends of the lens 100. The both side ends of the lens 100 refer to the left and right side ends where the temples 300 are placed when the eyewear is worn on a user, and one surface of the lens 100 refers to a surface of the lens 100 facing the user's face when the eyewear is worn on the user. Thus, as the frame 200 is coupled to one surface at each of the both side ends of the lens 100, a portion of the frame 200 exposed when the user is viewed from the outside is minimized, thereby increasing the user's visibility and ensuring an excellent design.

More specifically, the lens 100 may include one surface facing the user, the other surface facing the outside, lateral edges in a left-right direction, and upper and lower edges in an up-down direction. The frame 200 may be coupled to one surface at each of the lateral edges of the lens 100. Accordingly, only the partially exposed portion at a lateral edge may be visible on the other surface of the lens 100, and the portion of the lens 100 covered by the frame may be minimized on the front side.

In addition, the temple 300 may be coupled to the frame 200 and seated on a user's ear, allowing the user to wear the eyewear. The temple 300 may be hinged to the first frame and the second frame, enabled to be folded. The temple 300 is connected to the opposite side of a portion of the frame 200 coupled to the lens 100. That is, the eyewear may be configured such that the lens 100 is coupled to one side of the frame 200 while the temple 300 is coupled to the other side.

In addition, the frame 200 is coupled to one surface of the lens 100 with an adhesive layer 400 interposed therebetween. The adhesive layer 400 may be formed of various adhesive materials such as thermosetting resins, ultraviolet-curing resins, adhesive-containing films, and the like. For example, the adhesive layer 400 may be formed of polyacetal resin. The frame 200 may be coupled to only a portion of both side ends on one surface of the lens 100 and fixed to the lens 100, thereby minimizing a visible portion of the frame 200 on the other surface of the lens 100 and ensuring the frame 200 fixed to the lens 100. In addition, the adhesive layer 400 may be formed using a hot melt method. That is, the adhesive layer 400 composed of hot melt adhesive may be adhered between the frame 200 and the lens 100 by ultrasonic welding. In this way, mass production may be facilitated by the hot melt method.

The lens 100 may include a recessed guide groove 130 that is formed at each of both side ends and recessed inward toward the center of the lens 100. The frame 200 includes a protruding guide portion 230 that is inserted into the recessed guide groove 130 of the lens 100 when the frame 200 is coupled to each of the both side ends of the lens 100. On the other side of the lens 100, the protruding guide portion 230 of the frame 200 is exposed to the outside through the recessed guide groove 130, allowing the frame 200 to make contact with only one surface of both side ends of the lens 100.

As described above, if the frame 200 is coupled with the adhesive layer 400 applied to only one surface at each of the both side ends of the lens 100 in order minimize the portion of the frame 200 adhered to and fixed to the lens 100, the frame 200 may not be coupled at an accurate position. In particular, in continuous production processes, it may be difficult to set an accurate position when the frame 200 is coupled to only one surface of the lens 100 and attached to only a portion of a side end of the lens 100. In the present invention, the recessed guide groove 130 is formed at each of the both side ends of the lens 100, recessing inward toward the center of the lens 100, and the protruding guide portion 230 of the frame 200 is formed. Thus, the protruding guide portion 230 of the frame 200 can be inserted into the recessed guide groove 130, so that the frame 200 can be placed at an accurate position.

In other words, when the frame 200 is coupled to the lens 100 with the adhesive layer 400 applied to only a portion of one surface of the lens 100, a visible portion of the frame 200 from the outside may be minimized but this may result in an inaccurate positioning of the frame 200. Therefore, by forming the recessed guide grooves 130 at a side end of the lens 100, where the frame 200 is coupled, and forming the protruding guide portion 230 in the frame 200 so as to be coupled to the recessed guide groove 130, the frame 200 may be coupled to the lens 100 with a minimized area and section while ensuring precise placement, thereby minimizing defects during product manufacturing.

Meanwhile, in the first frame or the second frame, a first width P1 at a position near the center of the lens 100 on a cross-section within the same horizontal plane as a horizontal plane of the lens 100 may be smaller than the second width P2, which is measured at a lateral edge of the lens 100. That is, the frame 200 has a longer second width P2 at the outermost side, corresponding to a lateral edge of the lens 100, and a smaller first width P1 at the innermost side, near the center of the lens 100. This configuration ensures stable coupling of the frame 200 to the lens 100 while minimizing a visible portion of the frame 200 toward the center of the lens 100, closer to the user's eyeball.

In a more detailed explanation of the relationship between the frame 200 and the other structural components, the first frame or the second frame may include a frame bonding surface 220 having one end coupled to the lens, and a temple coupling portion 225 extending from the frame bonding surface 220 and curved rearward to be coupled to the temple 300. The protruding guide portion 230 of the frame 200 may protrude to match a shape of the recessed guide groove 130 of the lens 100 between the frame bonding surface 220 and the temple coupling portion 225. That is, on the frame 200, the temple 300 may be coupled to the temple coupling portion 225, and the frame bonding surface 220 may be formed at a position opposite to the temple coupling portion 225 and match a surface shape of the lens 100. In addition, in the middle, the protruding guide portion 230 formed to extend from the frame bonding surface 220 and protrudes from the frame bonding surface 220 in an upward direction (a direction toward the recessed guide groove of the lens) to match the shape of the recessed guide groove 130 of the lens 100. Accordingly, the protruding guide portion 230 may be inserted into the recessed guide groove 130 to set the exact position where the frame 200 is to be placed, and coupling with the lens 100 may be possible using the frame bonding surface 220 and the adhesive layer 400. The adhesive layer

400 may be an adhesive film (tape) with a groove 430 formed at a position corresponding to the protruding guide portion 230 to match the flat shape of the frame bonding surface 220, or may be an adhesive material applied and hardened to match the flat shape of the frame bonding surface 220.

Meanwhile, an area formed by the adhesive layer 400 may be included in the frame bonding surface 220. To this end, as described above, the adhesive layer 400 may be composed of adhesive film (tape) to correspond to or be included in the flat shape of the frame bonding surface 220, or the adhesive layer 400 may be formed within the flat shape of the frame bonding surface 220 after an adhesive material is applied and completely cured. In doing so, it is possible to prevent the adhesive material from escaping outside the frame bonding surface 220 even after the frame 200 is coupled and bonded to the lens 100, thereby enhancing the product quality.

Meanwhile, FIG. 6 shows a schematic exploded perspective view of eyewear with minimized exposure of a frame to the outside according to another embodiment of the present disclosure.

Referring to FIG. 6, in the eyewear with minimized exposure of a frame to the outside according to another embodiment of the present disclosure, the lens 100 further includes a surface-treated area 800 formed at a position facing the frame bonding surface 220. The surface-treated area 800 may be formed by creating scratches in a portion of the surface of the lens 100 by laser cutting or etching. It may be understood that the scratches are formed to create intersecting grooves in specific patterns or to introduce surface roughness to a portion of the smooth surface of lens 100.

As such, the surface-treated area 800 is formed in the surface of the lens 100 facing the frame bonding surface 220. Thus, it is possible to increase a bonding area and adhesion strength of the adhesive layer 400 by the surface roughness after the frame 200 is coupled to the lens 100, thereby effectively preventing undesired displacement of the frame 200 or separation from the lens 100. In conventional eyewear, a frame is structured to surround one surface, the other surface, and a side surface of a lens to ensure structurally stable bonding. On the other hand, in eyewear of the present disclosure, in order to minimize the visibility of the frame 200 from the outside, the lens 100 and the frame 200 are coupled by adhesive force, with the adhesive layer 400 applied to one surface of lens 100. Additionally, the surface-treated area 800 is created at the location where frame bonding surface 220 contacts lens 100, enhancing the bonding strength (adhesion strength) provided by adhesive layer 400, effectively reducing the visibility of frame 200 while preventing the frame 200 from detaching from lens 100.

Meanwhile, the eyewear may further include a coloration layer 700 disposed between the lens 100 and the adhesive layer 400 and applied to the surface-treated area 800 of the lens 100. The coloration layer 700 includes, but is not limited to, coloring materials such as ink, or it may be a coloring material coated on a surface through sputtering. If a scratch occurs on the surface of the lens 100 by forming the surface-treated area 800 as described above, the scratch may be visible from the outside. With the coloration layer 700 formed as described above, it is possible to increase the bonding force between the lens 100 and the frame 200 and prevent the reduction of design elements due to the visibility of the surface-treated area 800 from the outside.

FIG. 7 shows a rear perspective view showing a lens portion according to yet another embodiment of the present disclosure.

Referring to FIG. 7, in the eyewear with minimized exposure of a frame to the outside according to yet another embodiment of the present disclosure, a surface-treated area 800 of the lens 100 may be formed by creating scratches at a portion of a surface of the lens 100 by laser cutting or etching, and the surface-treated area 800 may include: a first scratch 820 sloping in a direction toward the center of the lens 100 where the recessed guide groove 130 of the lens is formed; a second scratch 830 sloping in a direction different from that of the first scratch 820; and a third scratch 810 spaced in a direction perpendicular to a first direction toward the center of the lens.

In other words, the first scratch 820 may be arranged to slope upwards with respect to the first direction, in which the recessed guide groove 130 is directed toward the center of the lens 100; the second scratch 830 may be arranged to slope downwards with respect to the first direction; and the third scratch 810 may be arranged to be orthogonal to the first and second scratch (i.e., arranged in a direction perpendicular to the first direction). Accordingly, it is possible to prevent movement in the up, down, left, and right directions while the frame bonding surface 220 of the frame 200 coupled to the lens 100 is in a coupled state.

Meanwhile, FIG. 8 shows a side perspective view schematically showing the frame and temples according to yet another embodiment of the present disclosure, FIG. 9 shows a side view schematically showing a frame and a temple according to yet another embodiment of the present disclosure, and FIG. 10 shows a cross-sectional view taken along line A-A' in FIG. 9.

Referring to FIGS. 8 to 10, in the eyewear with minimized exposure of a frame to the outside according to yet another embodiment of the present disclosure, the frame bonding surface 220 may further include an overflow prevention line 221 that protrudes to form a closed curve on an outer edge. The overflow prevention line 221 is formed to protrudes to form a closed curve on the outer edge, ensuring that the adhesive layer 400 does not overflow beyond the overflow prevention line 221 when the frame bonding surface 220 is bonded and coupled to the lens 100, thereby preventing the adhesive layer 400 from protruding outward from the outer edge of the frame bonding surface 220.

In addition, the frame bonding surface 220 may further include a recessed line 222 formed adjacent to a position where the overflow prevention line 221 is formed on the inner side of the closed curve created by the overflow prevention line 221. Accordingly, after the adhesive material forming the adhesive layer 400 is applied within the frame bonding surface 220, the adhesive material spreads due to the coupling between the frame bonding surface 220 and the surface of the lens 100 and is then directed into an area of the recessed line 222, where the adhesive material becomes encapsulated, ultimately preventing the adhesive material from overflowing beyond the overflow prevention line 221.

Meanwhile, FIG. 11 is a cross-sectional view showing a state in which an adhesive member is applied to a frame according to an embodiment of the present disclosure, and FIG. 12 is a cross-sectional view schematically showing how a lens and a frame are coupled by an adhesive member according to an embodiment of the present disclosure. With reference to FIGS. 11 and 12, how the frame 200 is coupled to the lens 100 by the overflow prevention line 221 and the recessed line 222 of the frame bonding surface 220 will be described. When an adhesive material 401 forming the adhesive layer 401 is applied to a central area 223 of the frame bonding surface 220 in the frame 200, as shown in FIGS. 8 to 10, and then it is joined in place between the lens 100 and the frame bonding surface 220, the adhesive material 401 spreads in both directions, coming into contact with the surface of the lens 100. In this case, the adhesive material 401 may primarily flow into the recessed area of the recessed line 222, and the overflow prevention line 221 may prevent the adhesive material 401 from eluting to the outside.

Meanwhile, FIG. 13 is a cross-sectional view showing a portion taken along line A-A' of FIG. 9 according to another embodiment of the present disclosure.

Referring to FIG. 13, in an inner area 224 of the recessed line 222 of the frame bonding surface 220, a surface in contact with the lens 100 may curve toward the center in a way that faces toward the lens 100. As a result, the adhesive material may effectively spread around when the lens 100 and the frame bonding surface 220 are bonded and coupled to each other, thereby causing the adhesive layer 400 to spread evenly.

FIG. 14 is a cross-sectional view showing a portion taken along line B-B' of FIG. 1 according to another embodiment of the present disclosure.

Referring to FIG. 14, a vertical cross-section of the recessed guide groove of the frame 200 may be in a shape that is gradually curved toward the center of the lens. In addition, a vertical cross-section of the protruding guide portion 230 at each of both side ends of the frame 200 has a concave shape that gradually curves toward the center to correspond to the shape of the recessed guide groove 130. When the protruding guide portion 230 of the frame 200 is coupled to the recessed guide groove 130 of the lens 100, the concave shape of the protruding guide portion 230 may slide to correspond to the curved shape of the recessed guide groove 130 and be coupled thereto. That is, the recessed guide groove of the lens 100 may have a shape that, in a vertical cross-section, gradually curves inward toward the center in a thickness direction of the lens, with both sides in a convex shape to face each other. The protruding guide portion 230 of the frame 200 may be formed with both sides that gradually curve inward toward the center in the thickness direction of the lens so as to correspond to the curved cross-sectional shape of each of the both side ends of the lens 100 when the protruding guide portion 230 is inserted into the recessed guide groove. Accordingly, it is possible to effective preventing the frame 200 from separating in the thickness direction of the lens while the protruding guide portion 230 of the frame 200 is slidably coupled to the recessed guide groove of the lens 100 in a lateral direction.

Meanwhile, FIG. 15 is a schematic exploded perspective view of eyewear with minimized exposure of a frame to the outside according to yet another embodiment of the present disclosure.

Referring to FIG. 15, a plurality of recessed guide grooves 131 and 132 of the lens 100 may be formed and spaced apart from each other, and a protruding guide portions 240 and 250 of the frame may also be formed to correspond to the number of the recessed guide grooves 131 and 132. As such, as the plurality of recessed guide grooves 131 and 132 and the plurality of protruding guide portions 240 and 250 are arranged to be spaced apart from each other, it is possible to effectively prevent unwanted movement of the frame 200 coupled to the lens 100.

While the present disclosure has been described with reference to exemplary embodiments thereof, it will be understood by those of ordinary skill in the art that various changes in form and detail may be made therein without departing from the spirit and scope of the present disclosure. Therefore, the above-described embodiments should be considered in a descriptive sense only, and not for purposes of limitation.

The invention claimed is:

1. Eyewear comprising:

a lens formed at a position facing a user's left and right eyes when the eyewear is worn, with integrated portions corresponding to the left and right eyes;

a frame comprising a first frame and a second frame, each coupled to one surface at each of both side ends of the lens; and a temple coupled to the frame, wherein the frame is coupled to one surface of the lens with an adhesive layer interposed, wherein the lens comprises a recessed guide groove formed by being recessed inward from each of the both side ends toward center of the lens, and the frame comprises a protruding guide portion to be inserted into the recessed guide groove of the lens when being coupled at each of the both side ends of the lens, wherein the protruding guide portion of the frame is exposed to an outside through the recessed guide groove on the other surface of the lens, so that the frame contacts only one surface at each of the both side ends of the lens, wherein the first frame or the second frame comprises a frame bonding surface having one end to be coupled to the lens, and a temple coupling portion extending from the frame bonding surface and bent toward a rear end for coupling the temple, and wherein the protruding guide portion of the frame protrudes between the frame bonding surface and the temple coupling portion to match a shape of the recessed guide groove of the lens, wherein an area formed by the adhesive layer is included within an area of the frame bonding surface, and wherein the lens further comprises a surface-treated area formed at a position facing the frame bonding surface.

2. The eyewear of claim 1, wherein the lens comprises one surface facing the user, the other surface facing the outside, lateral edges in a left-right direction, and upper and lower edges in a top-bottom direction, and wherein the frame is coupled to only one surface at each of the lateral edges of the lens.

3. The eyewear of claim 1, wherein in the first frame or the second frame, a first width at a position close to the center of the lens on a cross-section of a horizontal plane identical to a horizontal plane of the lens, is smaller than a second width at a lateral edge of the lens.

4. The eyewear of claim 1, further comprising a coloration layer disposed between the lens and the adhesive layer and applied to the surface-treated area of the lens.

5. The eyewear of claim 1, wherein the surface-treated area of the lens is formed by creating scratches in a portion of a surface of the lens by laser cutting or etching, and wherein the surface-treated area is composed of: a first scratch sloping and spaced apart in a first direction toward the center of the lens, which is a direction in which the recessed guide groove of the lens is formed; a second scratch sloping and spaced apart in a direction different from the first direction; and a third scratch spaced apart in a direction perpendicular to the first direction toward the center of the lens.

6. The eyewear of claim 1, wherein the frame bonding surface further comprises an overflow prevention line protruding to form a closed curve on an outer edge.

7. The eyewear of claim 6, wherein the frame bonding surface further comprises a recessed line formed by being recessed inside a closed curve formed by the overflow prevention line adjacent to a position where the overflow prevention line is formed, thereby forming a closed curve.

8. The eyewear of claim 7, wherein an inner area of the recessed line of the frame bonding surface curves toward the center so that a surface in contact with the lens faces the lens.

9. The eyewear of claim 1, wherein the recessed guide groove of the lens has a vertical cross-section that is convexly curved toward the center of the lens, wherein a vertical cross-section the protruding guide portion at each of the both side ends of the frame has a concave shape that gradually curves inward toward the center to correspond to a shape of the recessed guide groove, and wherein when the protruding guide portion of the frame is coupled to the recessed guide groove of the lens, the protruding guide portion is slidably coupled so that a concave shape of the protruding guide portion corresponds to a curved shape of the recessed guide groove.

10. The eyewear of claim 1, wherein the recessed guide groove of the lens is formed as a plurality of recessed guide grooves, spaced apart from each other, and the protruding guide portion of the frame is also formed as a plurality of protruding guide portions, spaced apart from each other, to correspond to a number of the recessed guide grooves.

* * * * *